Patented Nov. 28, 1939

2,181,771

UNITED STATES PATENT OFFICE 2,181,771

METHOD OF POLYMERIZATION OF STYRENE

Norman D. Scott, Sanborn, N. Y., assignor to E. I. du Pont de Nemours & Company, Wilmington, Del., a corporation of Delaware No Drawing. Original application December 10, 1935, Serial No. 53,756. Divided and this application February 1, 1938, Serial No. 188,194.

2 Claims. (Cl. 260—91)

This invention relates to an improved method for polymerizing hydrocarbons.

This application is a division of my copending application S. N. 53,756, filed December 10, 1935, which is a continuation-in-part of application Serial Number 726,569, filed May 19, 1934, which has issued as U. S. Patent 2,048,169.

An object of the present invention is to provide novel and improved methods for polymerizing unsaturated hydrocarbons to produce a variety of useful polymerized substances, as hereinafter described. Further specific objects will be apparent from the following disclosure.

I have found that the addition compounds formed by the reaction of alkali metals with polycyclic aromatic hydrocarbons such as naphthalene, diphenyl and phenanthrene, and the like, have decided advantages as hydrocarbon polymerizing agents in that they are easily prepared, can be handled as solutions, do not ignite in contact with air under ordinary conditions, do not evolve hydrogen or ignite on contact with water, yet in general are more effective than the free alkali metals as polymerizing agents. Certain methods of forming these addition compounds are disclosed and claimed in my copending applications Serial Numbers 638,524 and 678,261, filed Oct. 19, 1932 and June 29, 1933, respectively, which have been issued as U. S. Patents 2,027,000 and 2,123,793, respectively. One convenient method is to dissolve sodium in a solution of naphthalene or other polycyclic aromatic hydrocarbon in liquid dimethyl-ether at a temperature somewhat below −24° C., while stirring or abrading the sodium in contact with the mixture to start the reaction. When the reaction is once started, the solution becomes highly colored and solution of the metal occurs at a rapid rate. The amount of sodium readily dissolved will range in general from one to two gram atoms per gram molecule of the aromatic hydrocarbon. Various other aliphatic ethers may be used as solvents in place of dimethyl ether, as for example, methyl ethyl ether, poly ethers such as dimethyl or diethyl glycol ethers, or cyclic ethers such as dioxane.

When the solution of the sodium hydrocarbon compound or mixture of compounds has been prepared, it either may be mixed with the hydrocarbon to be polymerized, or as is usually preferable to avoid wasting solvent, the methyl ether or other special solvent used in preparing the sodium compound may be partly distilled off and recovered before contacting the sodium compound with the hydrocarbon. In the latter case, it is advisable to leave a small amount of the solvent ether in contact with the sodium compound, e. g., equivalent to around 20% by weight of the compound, as this increases the stability of the sodium compound.

I have discovered that the herein described addition compounds of alkali metals and polycyclic aromatic hydrocarbons have a marked polymerizing effect when contacted with an unsaturated hydrocarbon which does not readily form substitution compounds of the alkali metals and which has conjugated double bonds, at least one of the conjugated double bonds occurring in an aliphatic radical. Further, I have found that these addition compounds have little or no polymerizing effect on unsaturated hydrocarbons which do not have conjugated double bonds as described above. Examples of hydrocarbons with conjugated unsaturation which may be readily polymerized by treatment with small amounts of the alkali addition compounds are butadiene, isoprene, dimethyl butadiene, styrene, cyclopentadiene, and 1,2-dihydronaphthalene.

My invention is not limited to these examples, as other unsaturated hydrocarbons of the class mentioned above, as well as their substitution derivatives, may likewise be polymerized by the method of the present invention. Also, my method may be applied to various products containing one or more of such unsaturated hydrocarbons, e. g., crude gasoline or other petroleum fractions.

The polymerizing action is rapid and complete, even at relatively low temperatures, e. g., 20 to 30° C. Alkali metals are known to cause polymerization of unsaturated compounds, but my herein described alkali metal addition compounds differ from the alkali metals in that they cause more rapid and more complete polymerization of the conjugated unsaturates than do alkali metals. For example, a small amount of an ether solution of the sodium naphthalene addition compound added to 1,2-dihydronaphthalene at 20 to 30° C. rapidly and substantially completely polymerizes the latter to a resinous substance, while an equivalent amount of sodium metal, under similar conditions polymerizes this hydrocarbon only very slowly and incompletely, even at elevated temperatures.

I have found that the herein described alkali metal addition compounds are selective in their polymerizing action in that they readily polymerize the conjugated unsaturates, while having substantially no polymerizing action on nonconjugated unsaturates, e. g., amylene or limonene.

The selective polymerizing action of the herein described alkali metal addition compounds is illustrated by the fact that whereas the sodium naphthalene compound causes rapid polymerization of butadiene, it has substantially no action on amylene.

My novel polymerizing agents may be contacted with the hydrocarbon to be polymerized by various methods, which will be apparent to those skilled in this art. I prefer to first dissolve the unsaturated hydrocarbon to be polyermized in a solvent ether of the type suitable for the formation of the alkali metal addition compound, as described above (e. g., dimethyl ethylene glycol ether) and then add a small amount of the alkali metal addition compound or an ether solution of the same.

The amount of the alkali metal hydrocarbon compound required will vary over a wide range, depending upon the temperature, time of contact, the nature and amounts of impurities in the hydrocarbon, and the degree of polymerization desired. Only small amounts of the addition compound will be required, for example, 1–10% of the weight of the compound to be polymerized. Ordinarily, a mere trace of the addition compound is sufficient to effectively polymerize the unsaturated compound; if moisture or other impurities with which the addition compound will react are present, a correspondingly larger amount of the addition compound must be added.

The polymerization will occur within a wide range of temperatures, including temperatures both below and above ordinary room temperature. For example, I have polymerized unsaturated hydrocarbons in accordance with the herein described invention at temperatures as low as $-60°$ C., and also at relatively high temperatures, e. g., 50 to 60° C. Preferably I operate at temperatures below the boiling point of the solvent employed. Generally, the physical properties of the polymer will vary, depending on the temperature employed, the higher temperatures favoring the formation of polymers of lower molecular weights and lower melting points. The polymers formed by my process are resinous in nature and vary from viscous, oily liquids to hard, brittle solids. The polymerized product may be recovered by removing solvent and unpolymerized hydrocarbons by means obvious to the skilled chemist. For example, the reaction mixture may be distilled, whereupon the polymer will remain as residue in the distillation vessel. In some cases the polymer will be precipitated from the solution and can be filtered off.

The invention is illustrated by the following examples, although variations of the method will be obvious:

*Example 1*

Forty cubic centimeters of a one-normal sodium naphthalene solution are prepared by the reaction of 1.0 gm. of sodium and 5.0 gms. naphthalene in 35 cc. of dimethylglycol ether. The solution is then placed in a 500 cc. capacity three-necked flask in which a nitrogen atmosphere is maintained. This flask is also equipped with an electric agitator and a dropping funnel is inserted through one of its necks. The sodium naphthalene solution is cooled to $-30°$C., and 100 gms. of 1,2-dihydronaphthalene is added through the dropping funnel at a rate consistent with maintaining the reaction temperature at the aforesaid value of $-30$ °C. Water is now dropped into the reaction mixture until the colored sodium compound is destroyed. The precipitated polymer is filtered off, washed with pure dimethylglycol ether, then with water and finally dried in an oven or vacuum desiccator. The yield of polymer is 90% of the theory or better.

The polymer obtained by this procedure has the appearance of a white amorphous powder which is substantially insoluble in all common solvents, including aliphatic and aromatic hydrocarbons, water and aliphatic alcohols. In high-boiling chlorinated hydrocarbon solvents it dissolves to some extent to form colloidal solutions. It is substantially infusible below decomposition temperatures, since when heated it does not melt at temperatures of 300° C., or below; at higher temperatures it softens and chars at the same time, but this does not take place until temperatures slightly below red heat have been attained. The solubility of polymer of 1,2-dihydronaphthalene in such solvents as alpha-chloronaphthalene to form colloidal solutions varies with the temperature at which the dihydronaphthalene has been polymerized. Polymer prepared at approx. 65° C., dissolves to the extent of about 1.36 gms. per 10 cc. of chloronaphthalene, and the solution gels on cooling. If this polymer is prepared at $-30°$ C. as above described, it dissolves only to the extent of about 0.25 gm. per 10 cc. of chloronaphthalene.

*Example 2*

Twenty grams of styrene and 10 cc. dimethyl glycol ether is placed in a small flask equipped with an agitator and in which a nitrogen atmosphere is maintained. With constant stirring and cooling, 10 cc. of normal sodium naphthalene solution is gradually added to the styrene solution. Polymerization takes place with the evolution of considerable heat. Ten cubic centimeters of normal sodium naphthalene solution contains 0.23 gram of sodium in the form of the sodium addition compound. A little water is added to the polymerization mixture to bleach the sodium compounds and carbon dioxide then is passed through the liquid to carboxylate the alkali. The carbonate is then filtered off and the ether solvent distilled from the resin. A yield of 19 grams of polymer is obtained.

Part of the solvent may be recovered from the ether solution of the alkali metal hydrocarbon compound before using the compound as polymerizing agent, in order to avoid loss of the solvent ether. It should be mentioned that if the solvent is completely distilled off, the alkali metal compound will decompose to form a mixture of aromatic hydrocarbon and a colloidal form of the metal. Such mixture will function only as an active form of alkali metal. I prefer to avoid the formation of substantial amounts of free metal in my polymerizing agent and I have found that such decomposition may be prevented by leaving in the mixture a small amount of the solvent, e. g. an amount equal to about 20% by weight or more of the alkali metal-hydrocarbon compound.

The various polycyclic aromatic hydrocarbons other than naphthalene may be reacted with sodium or other alkali metal (e. g., potassium or lithium) by the method described herein and the resulting alkali metal addition compounds may be used to polymerize unsaturated hydrocarbons in accordance with my herein described invention. Examples of polycyclic aromatic hydrocarbons which may be used in place of naphthalene in my invention are: diphenyl, dinaphthyl, anthracene, acenaphthene, phenanthrene, methyl naphthalene and retene.

I claim:

1. A process for polymerizing styrene comprising contacting styrene with an addition compound of an alkali metal and a polycyclic aromatic hydrocarbon, said compound consisting of one mol of said hydrocarbon chemically combined with two atoms of said alkali metal.

2. A process for polymerizing styrene comprising contacting styrene with the sodium addition compound of naphthalene, which compound may be represented by the formula $C_{10}H_8Na_2$.

NORMAN D. SCOTT.